United States Patent [19]

Burton et al.

[11] Patent Number: 4,911,519
[45] Date of Patent: Mar. 27, 1990

[54] PACKAGING TECHNIQUES FOR OPTICAL TRANSMITTERS/RECEIVERS

[75] Inventors: William H. Burton, Austin, Tex.; Steven D. Robinson, Lopatcong Township, Warren County, N.J.

[73] Assignee: AT&T Bell Laboratories, Murray Hill, N.J.

[21] Appl. No.: 305,249

[22] Filed: Feb. 1, 1989

[51] Int. Cl.⁴ .............................................. G02B 6/36
[52] U.S. Cl. .............................. 350/96.20; 350/96.15
[58] Field of Search ............... 350/96.15, 96.17, 96.20; 250/227, 552; 357/17, 19, 30, 74, 80

[56] References Cited

U.S. PATENT DOCUMENTS

| | | | |
|---|---|---|---|
| 3,995,935 | 12/1976 | McCartney | 350/96.15 |
| 4,186,995 | 2/1980 | Schumacher | 350/96.20 |
| 4,222,629 | 9/1980 | Dassele et al. | 350/96.20 |
| 4,273,413 | 6/1981 | Bendiksen et al. | 350/96.20 |
| 4,296,998 | 10/1981 | Dufft | 350/96.17 |
| 4,307,934 | 12/1981 | Palmer | 350/96.20 |
| 4,439,006 | 3/1984 | Stevenson | 350/96.20 |
| 4,752,109 | 6/1988 | Gordon et al. | 350/96.20 |

FOREIGN PATENT DOCUMENTS 0053482  6/1982  European Pat. Off. .......... 350/96.20

OTHER PUBLICATIONS

Holden, LED Array Package for Optical Data Links, The Bell System Technical Journal, Mar. 1979, pp. 713–720.

Primary Examiner—William L. Sikes
Assistant Examiner—Phan T. Heartney
Attorney, Agent, or Firm—Wendy W. Koba

[57] ABSTRACT

Advanced packaging techniques are utilized to provide updated packaging for optical transmitters and receivers. In particular, the hybrid integrated circuit (HIC) used to form either the transmitter or receiver circuitry in the prior art has been replaced by a plastic dual-in-line package (DIP). The DIP includes specialized leads (prongs) formed through the short end of the DIP to provide direct connection to the optical device. These end-prong leads thus significantly decrease the parasitic capacitance associated with conventional DIP connections. A capacitor may be molded into the DIP across the power supply leads to provide filtering for the package. Thermal dissipation is provided by two separate means in this package. First, the leadframe of the DIP is formed to include relatively long leads which extend through the bottom of the package to carry away the heat generated by the integrated circuit and the DIP itself may be disposed on a thermally conductive substrate which will also dissipate heat generate by the integrated circuit. Second, the metal cover of the package is attached to the optical device by a thermally conductive epoxy to provide a heat path for the optical device. Molded plastic piece parts are utilized to form the optical sleeve and an optical frame assembly.

16 Claims, 3 Drawing Sheets

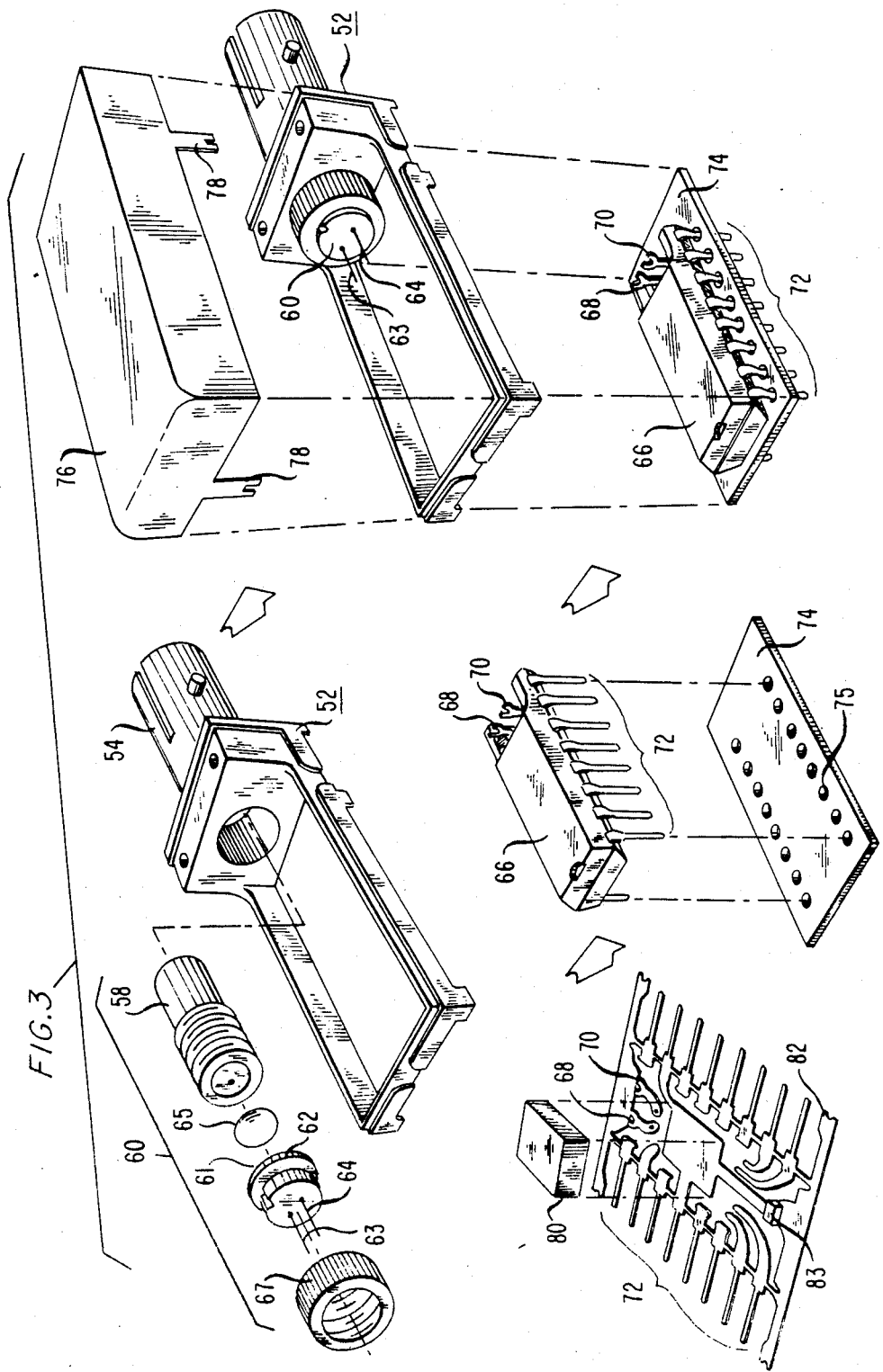

PACKAGING TECHNIQUES FOR OPTICAL TRANSMITTERS/RECEIVERS

BACKGROUND OF THE INVENTION

1. Field of the Invention

The present invention relates to improved packaging techniques for optical communication systems and, more particularly, to techniques for providing a cost-effective package suitable for either transmitter or receiver applications.

2. Description of the Prior Art

There exist many different arrangements for packaging optical transmitters or receivers. For example, the optical device (e.g., laser, LED, or PIN photodiode) may be encased in an optical assembly with appropriate lensing and an optical fiber attached to the assembly. The electronics required for operating the optical device (a modulation circuit for a transmitter or a detection circuit for a receiver) are separately assembled (on a printed wiring board, for example) and connected to the housed optical device by conventional electrical leads. Alternatively, the electronics may be fully enclosed in a separate housing, with only the leads exposed for connection to the optical device. An advantage of using separate housings is that many different electronic circuits may be connected to the same optical device. For example, the electronics for a data link application may operate with various types of logic signals (e.g., ECL or TTL) without the need for altering the package housing the optical device. Additionally, if either the electrical or optical portion of a transmitter or receiver were to experience a failure, the working portion may be disconnected and re-used with another arrangement. A major disadvantage of separate packaging is the overall size of the transmitter or receiver. With two separate packages, or an optical package mounted on a printed wiring board, the system requires a rather large space. Further, such a system is susceptible to electrical noise introduced by the necessarily long lead lengths of the connections between the electronics and the optical device. This electrical noise factor becomes a significant concern at bit rates exceeding approximately 10 Mb/s. Also, long leads may limit the maximum bit rate of both the transmitter and receiver, due to parasitic lead inductance (limits transmitter) and parasitic capacitances (limits receiver).

These and other concerns have led to the development of package designs which provide for the electronics and optical device to be housed in the same unit. In particular, there exist a number of such unitary arrangements particularly suited for data link applications which utilize relatively low bit rates ($<=50$ Mb/s) and operate over relatively short distances ($<=3$ km). Most of these applications use an LED as the transmitting device and a PIN photodiode as the receiving device. Many of these unitary packages are relatively expensive, as a result of using a hybrid integrated circuit (HIC) arrangement for the electronics, with the optical subassembly attached to the HIC. Additionally, the optical subassemblies associated with these packages are often formed of machined metallic components, adding to the cost of the system. Further, these subassemblies have been known to experience alignment difficulties. There also exist fabrication problems in mating the various piece parts (i.e., outer housing, optical subassembly and HIC). These unitary packages are also known to generate a significant amount of heat, where thermal management of optical data link transmitters and receivers has been a significant problem. Lastly, in many instances, the packaging processes for a transmitter and receiver are very distinct, leading to manufacturing problems and increasing the overall expense of the packaged system.

Thus, a need remains in the prior art for improving the packaging techniques utilized to form optical transmitters and receivers, particularly where the necessary electronics are to be housed with the optical device.

SUMMARY OF THE INVENTION

These and other problems associated with the prior art are addressed by the present invention which relates to improved packaging techniques for optical data link communication systems and, more particularly, to techniques for providing a cost-effective package for either transmitter or receiver applications.

In accordance with the present invention, the hybrid integrated circuit (HIC) used in the prior art for the electronic portion of the arrangement is replaced with a plastic dual-in-line package (DIP). The DIP is formed to include a pair of end-prong leads for connection to the optical device, where the use of leads formed on the end of the package has been found to significantly reduce the parasitic capacitance and noise pick-up associated with conventional DIP leads. Power supply filtering may be provided by placing a bypass capacitor across the power supply leads on the leadframe, and then molding the capacitor into place when the DIP is formed. Additionally, molded plastic piece parts are used to form the optical subassembly housing and fiber connector port, replacing metallic piece parts which were either machined or die cast in the prior art. The use of molded plastics realizes a significant cost savings.

It is an aspect of the present invention to provide improved thermal management by utilizing the leads exiting the DIP as the dissipation path for the heat generated by the integrated circuit. In accordance with the present invention, the DIP leads are formed to be somewhat longer than conventional leads so that they may exit through the floor of the package and serve as the output leads for the completed assembly. The floor of the package may consist of a conventional printed wiring board (double-sided rigid epoxy glass, solder-plated copper board), which serves as a ground plane for the transmitter and receiver. This floor provides additional EMI shielding and heat sinking for the DIP, as well as sealing the bottom of the package, and provides for interconnections between DIP leads and/or external components. A metallic cover, attached to the optical subassembly by a thermally conductive epoxy, provides for the dissipation of heat generated by the optical device. Additionally, the metallic cover is formed to connect to the floor of the package so as to provide EMI shielding for the device. The provision of this grounding structure has been found to significantly reduce the high gain sensitivity (feedback from output to input) and EMI susceptibility of the receiver integrated circuit.

It is another aspect of the present invention to provide a package which may be utilized with either transmitter or receiver assemblies. Accordingly, the only modifications required for the fabrication sequence, as will be described in more detail below, are the substitution of the receiving optical device for the transmitting optical device, and the receiver DIP for the transmitter DIP.

These and other aspects of the present invention will become apparent during the course of the following discussion and by reference to the accompanying drawings.

BRIEF DESCRIPTION OF THE DRAWING

Referring now to the drawings, where like numerals represent like parts in several views:

FIG. 3 illustrates a typical fabrication sequence used to form the package illustrated in FIG. 2.

DETAILED DESCRIPTION

Figure 1:
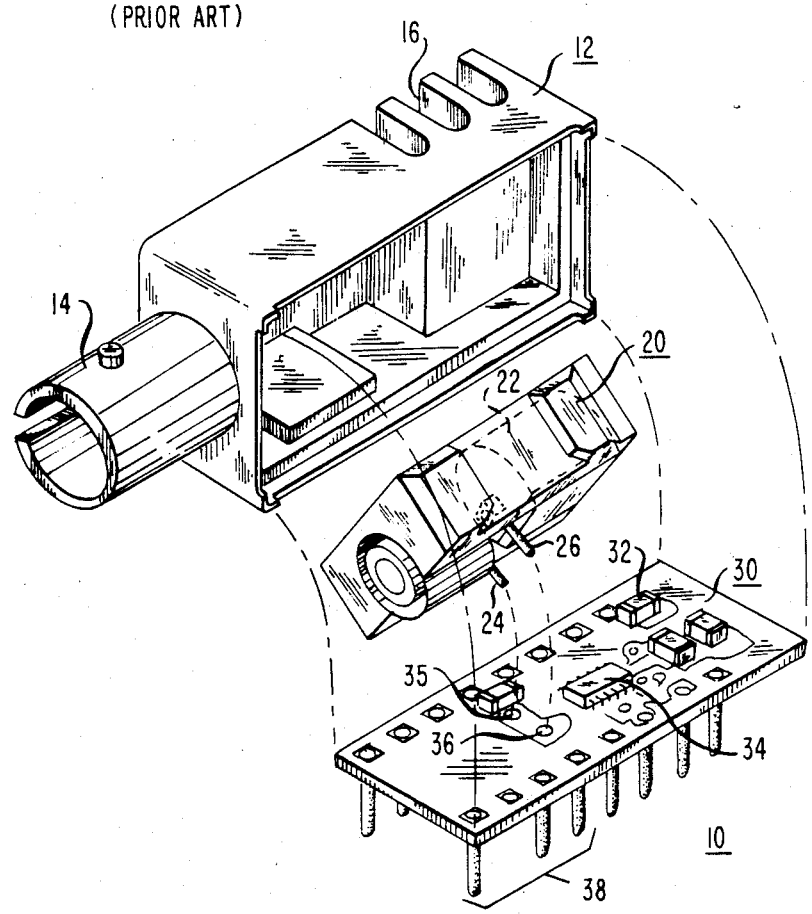
FIG. 1 illustrates an exemplary prior art arrangement for providing electrical and optical subassemblies within the same housing.

An exemplary prior art package 10 for encasing both an optical device and its associated electronics is illustrated in FIG. 1. As shown, package 10 comprises a metallic outer housing 12, where housing 12 usually comprises a die cast piece part formed to include an optical fiber connector port 14 and fins 16. In the arrangement illustrated in FIG. 1, optical fiber connector port 14 comprises a standard connector port utilized by the assignee for most optical fiber connections. Various other types of connector ports may also be formed. Fins 16 are utilized to provide a degree of thermal dissipation to package 10, although in many operating environments, especially when long wavelength devices are utilized (higher drive current requirements), external cooling must also be employed. Package 10 also includes an optical subassembly 20 for encasing the optical device 22 (not shown) and a lensing element 23 (not shown). Optical subassembly 20 may comprise a metallic piece part which is machined to provide the necessary alignment between optical device 22, lens 23 and an optical fiber (not shown). In the view of FIG. 1, only the pair of leads 24,26 exiting optical device 22 are visible. As discussed above, the electronic circuitry associated with this type of prior art package is formed as a hybrid integrated circuit (HIC) 30 including both discrete elements, such as a capacitor 32, and an integrated circuit 34, which contains the logic circuitry required to operate the transmitter or receiver. Leads 24,26 of optical device 22 are inserted through gold-plated holes 35,36 in HIC 30, where this connection is then soldered to provide the electrical connection between electronic circuitry 34 and optical device 22. Problems may develop with this type of attachement in that leads 24,26 are often very fragile and may not withstand the attachement procedure. External connections between the electronics and a power supply and/or other monitoring devices are provided by a plurality of leads 38 formed through the bottom surface of HIC 30.

Although arrangements such as package 10 have become a conventional standard in the industry for providing data link packages, there exist a number of problems which are addressed by the improved packaging arrangement of this invention. In particular, the use of hybrid ICs for the electronic components is very expensive, especially when a wirebondable gold plating is used to provide the connections between components. Additional fabrication problems with the HICs, including the placement of leads through a HIC, further increase their their expense. Another large expense in incurred in the fabrication of optical subassembly 20, which must be precisely machined. Additionally, as mentioned above, external cooling is often required when optical devices requiring a relatively high drive current (i.e., long wavelength devices operating at 125 mA) are included in an arrangement such as package 10. Various other problems may also exist with data link transmitters and receiver housed in arrangements such as prior art package 10.

Figure 2:
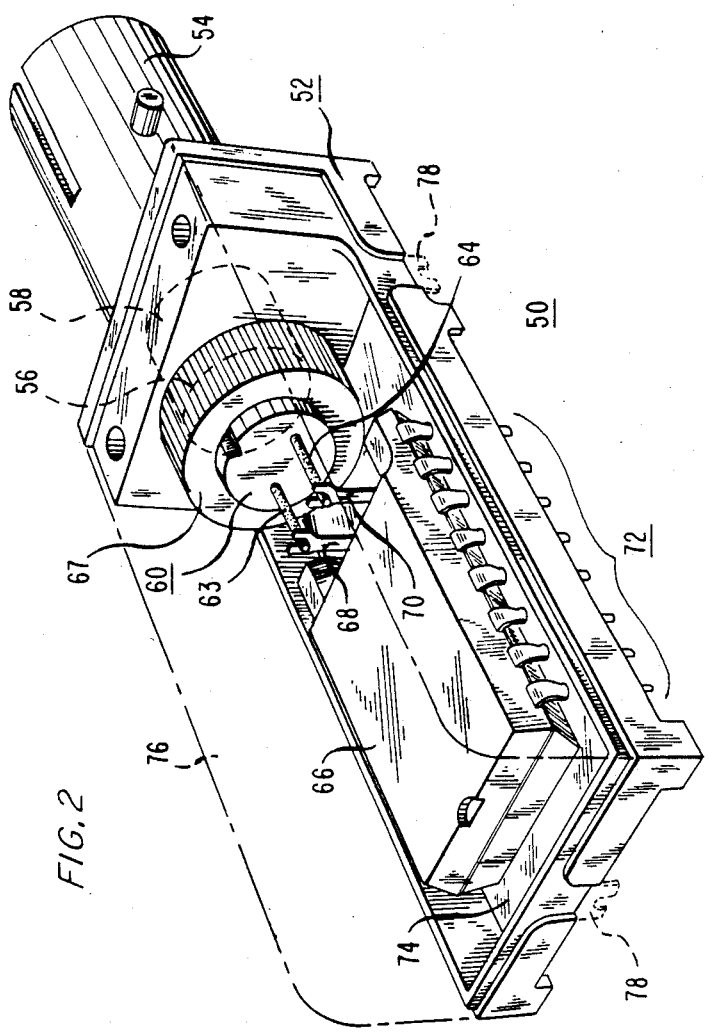
FIG. 2 illustrates an exemplary package formed using the techniques of the present invention.

Referring to FIG. 2, an improved package 50 formed in accordance with the present invention has been developed to overcome these and other problems associated with prior art package 10. As shown in FIG. 2, package 50 comprises a connector frame assembly 52 formed of a high performance engineering plastic material, such as the liquid crystal polymer Xydar ® sold by Amoco Inc, or Vectra ® sold by Celanese, a division of Hoechst. Connector frame assembly 52 is molded to include an optical fiber connector port 54, similar in form to connector port 14 of package 10, where the molding may be accomplished utilizing any well-known technique including, but not limited to, injection molding, compression molding, or transfer molding. An advantage of using a molded piece part in accordance with the present invention is that the shape of connecting piece 54 of frame 52 may be easily adapted to other connector styles by changing the mold. This is a once-and-done operation as compared with prior art machined housings where a new connector design must be repeatedly manufactured for each package. An advantage of using plastic piece parts for the frame and optical subassembly is that no secondary finishing operations, such as reaming or plating, are required to produce corrosion-resistant, high-precision parts which are needed to provide alignment between the optical fiber and optical device. Thus, molding significantly reduces the costs associated with any connector port re-design. Connector frame assembly 52 also includes a bore 56 (illustrated in FIG. 3) which is formed through the end of frame 52 to accommodate the fitting of an optical assembly 60. In particular, a sleeve 58, formed of the same plastic material as frame 52, is designed to attach to optical assembly 60 including an optical device and lens (not shown). The various components of optical assembly 60 will be described in detail below in association with FIG. 3. A snap-fit is used to insert sleeve 58 into bore 56. Frame 52 is molded such that the core region of an optical fiber (not shown) will be aligned with the active region of the optical device when inserted into sleeve 58. As with the prior art arrangement described above, optical assembly 60 includes a pair of leads 63,64 for connection to the electronic circuitry.

A significant improvement in the packaging arrangement of the present invention is the utilization of a plastic dual-in-line package (DIP) 66 to house the required electrical components. The use of a plastic DIP in place of the customized HIC of the prior art has been found to provide a significant cost savings. As shown in FIG. 2, DIP 66 comprises a conventional 16-pin DIP which has been modified to include a pair of end-prong leads 68,70 for connection to leads 63,64 of optical assembly 60. In the novel configuration of the present invention, leads 68,70 may be bent upwards at a 90° angle to facilitate the connection between optical assembly 60 and the electronics. The ends of leads 68,70, as illustrated in FIG. 2, may be U-shaped to further improve the ease of this connection. The utilization of end-prong connections between the optical device and the electronics has been found to significantly reduce the parasitic noise elements which are associated with connecting the optical device to the conventional leads formed along the side of the DIP.

As will be discussed below in association with FIG. 3, a bypass capacitor (not shown) may be formed across the power supply leads and molded into place during the formation of the plastic covering of DIP 66. The bypass capacitor serves to filter most of the self-generated noise of the amplifier output stage (receivers of this type may exhibit a gain of up to 100 dB), as well as the modulation noise associated with the external power supply (not shown). As mentioned above, DIP 66 of the present invention utilizes relatively long leads 72, for example, 0.155 inches, which protrude through a bottom support piece 74 and are used as the external connections for package 50. By allowing leads 72 to exit package 50, the heat generated by the electronic circuitry may simply be dissipated by following the path along leads 72 to the external supporting framework. For example, the electronic circuitry within DIP 66 may be disposed directly on a thermally conductive support member which becomes one of the DIP leads, providing a path for heat dissipation.

The heat generated by the optical device, in particular a transmitting device such as an LED, is dissipated through a metallic cover plate 76 (illustrated in phantom in FIG. 2) which is used to shield both the semiconductor optical device and DIP 66. Cover plate 76 may comprise a stamped (or drawn) sheet of nickel-plated copper which is appropriately bent to form the necessary side and back faces. A thermally conductive epoxy (not shown) is used to attach optical assembly 60 to cover plate 76 to provide the necessary thermal path, as well as to hold cover plate 76 in place. The utilization of metallic cover plate 76 with a receiver formed in accordance with the present invention provides a grounded shielding structure for the receiver circuitry. In particular, cover plate 76 includes tabs 78 which are soldered (or epoxied) to an electrical ground formed on bottom support piece 74. An epoxy which is thermally and/or electrically conductive may be used to attach the receiver optical assembly to cover plate 76. The use of these grounding techniques has been found to significantly improve the sensitivity of the receiver circuit and lessen its EMI susceptibility.

FIG. 3 illustrates, in an exploded view form, an exemplary fabrication sequence for forming package 50 of the present invention. An advantage of the arrangement of the present invention is that parallel fabricating lines may be used to form the optical and electrical subassemblies, as illustrated along the top and bottom lines of FIG. 3, respectively. Therefore, any components such as optical devices, lenses, or integrated circuits which are found to be defective during the fabricating sequence may simply be replaced before the final package is completely assembled and tested.

Referring in particular to the illustrated fabrication sequence, optical assembly 60 includes a semiconductor optical device 61, for example an AlGaAs or InGaAsP LED (for a transmitter package), or a silicon or InGaAs PIN (for a receiver package). Optical device 61 is then mounted onto a header 62 formed of an appropriate material (plastic or metallic, with the latter better for heat sinking purposes). As shown in FIG. 3, header 62 may comprise a variant of conventional electrical/optical headers, where in this case the header is inverted so as to include a top flange portion 62' (allowing for easy gripping and movement of header 62 during alignment). Leads 63,64 protrude through the bottom of header 62. The optical assembly in this form is then tested for satisfactory operation. Correct placement of optical device 61 within header 62 may be ensured by forming header 62 to include a depressed region, as illustrated in FIG. 3. An internally threaded nut 67 is then inserted over header 62 and device 61 (nut 67 comprising any suitable material, for example, plastic or metallic). Sleeve 58, which may hold a lens 65, is then threaded onto nut 67 and optical device 61 is aligned within sleeve 58. Alternatively, lens 65 may be placed on device 61 prior to the attachment of sleeve 58. As shown in FIG. 3, sleeve 58 comprises an elongated barrel section which is sized to provide a snap-fit of optical assembly 60 into bore 56 of connector frame 52. As discussed above, connector frame 52, as well as sleeve 58, are formed of an appropriate plastic material, such as a liquid crystal polymer, which is capable of being molded to provide the desired form. As discussed above, frame 52 includes an appropriately shaped fiber connecting port 54.

As mentioned above, the fabrication of the electrical portion of the assembly proceeds along a parallel processing line. In particular, an integrated circuit 80 (either a transmitter IC or a receiver IC) is fabricated and tested at the wafer level. The wafer is then diced and an individual integrated circuit 80 is attached to a leadframe assembly 82. Leadframe assembly 82 is formed to include the conventional leads 72 which exit along the sides of DIP 66, as well as the pair of end-prong leads 68,70. Also, as mentioned above, a bypass capacitor 83 may be epoxied (or soldered) into place across the pair of leads which will be connected to the power suply, as illustrated in FIG. 3. The structure is encapsulated in plastic utilizing a specialized mold which allows for end-prong leads 68,70 to protrude as illustrated in FIG. 3. Leads 68, 70 and 72 are punched out of leadframe 82 to form DIP 66, where end-prong leads 68,70 may be bent upwards to form the 90° degree angle described above. The remaining leads 72 are bent downwards as in standard DIP packages. The encapsulated integrated circuit 80 is then tested in this form. DIP 66 is then placed on bottom support plate 74, where plate 74 may comprise a conventional printed wiring board, for example, a solder-plated copper epoxy glass substrate suitable for this purpose. As shown in FIG. 3, support plate 74 includes a plurality of holes 75 to allow for leads 72 to pass therethrough.

At this stage in the fabrication sequence, the subassemblies are joined together, as illustrated in FIG. 3, with leads 63,64 of optical assembly 60 soldered to their appropriate end-prong leads 68,70. Metal cover 76 is then attached as shown in FIG. 3, with tabs 78 used to connect cover 76 to bottom support plate 74. The final assembled package 50 is as illustrated in FIG. 2.

It is to be understood that there exist many variations in the packaging procedure described above which are considered to fall within the scope of the present invention. For example, a transmitter so formed may utilize an appropriate semiconductor laser optical device in place of the LED (long or short wavelength) as described above. An edge-emitting LED may also be utilized. Similarly, a receiver formed in accordance with the present invention may utilize an avalanche photodiode (APD) in place of the PIN discussed above. The lensing arrangements may also vary. Further, various materials other than those mentioned above may be used to form the piece parts of the package. For example, there exist many metallic compositions which can be used to form cover plate 76, including nickel-plated copper, stainless steel, or aluminum. Frame housing 52 and sleeve 58 may comprise materials other than a liquid crystal polymer, for example, the plastic material Ryton®, a polyphenylene sulfide compound which is manufactured by Phillips, as long as the material may be molded to provide the desired form. Various other modifications not explicitly mentioned above would be obvious upon use of the packaging techniques discussed above and are therefore considered to fall within the scope of the present invention.

We claim:

1. An optical communication arrangement comprising
   a semiconductor optical device;
   mounting means for said optical device including a pair of electrical leads extending therefrom;
   an optical sleeve comprising a plastic material which is capable of being molded, said optical sleeve including a central bore for insertion of an optical fiber assembly;
   a connector frame assembly comprising a plastic material identical in composition to said optical sleeve, said frame assembly including a bore formed through a endwall thereof for insertion of said optical sleeve, said connector frame assembly further comprising an optical fiber connector port, said connector port appropriately shaped by means of molding;
   a plastic dual-in-line package for housing an integrated circuit required to operate said semiconductor optical device, said dual-in-line package including a pair of end-prong leads for connection to the pair of electrical leads extending from said mounting means, said dual-in-line package further comprising a plurality of relatively long leads extending from both sides of said package;
   a bottom support plate disposed under said dual-in-line package in a manner such that the plurality of relatively long leads pass through a plurality of associated holes formed in said bottom support plate, said leads being utilized for connection to external circuitry; and
   a metallic cover plate disposed to contact said connector frame assembly such that said dual-in-line package and said optical sleeve are fully encased.

2. An optical communication arrangement formed in accordance with claim 1 wherein the plastic material forming the optical sleeve and the connector frame assembly comprises a liquid crystal polymer material.

3. An optical communication arrangement formed in accordance with claim 1 wherein the metallic cover plate comprises nickel-plated copper.

4. An optical communication arrangement formed in accordance with claim 1 wherein the bottom support plate comprises an epoxy glass material.

5. An optical communication arrangement formed in accordance with claim 1 wherein the end-prong leads of the dual-in-line package include U-shaped ends and are bent upwards to attach to the pair of electrical leads extending from said mounting means.

6. An optical communication arrangement as in claim 1 wherein the arrangement comprises an optical transmitter including a transmitting optical device, with a thermal epoxy utilized to attach the metallic cover plate to the transmitting optical device so as to provide a path for the dissipation of heat generated by said transmitting optical device.

7. An optical transmitter as defined in claim 6 wherein the transmitting optical device comprises an LED.

8. An optical transmitter as defined in claim 7 wherein the LED comprises an AlGaAs LED.

9. An optical transmitter as defined in claim 7 wherein the LED comprises an InGaAsP LED.

10. An optical transmitter as defined in claim 7 wherein the LED comprises an edge-emitting LED.

11. An optical transmitter as defined in claim 6 wherein the transmitting optical device comprises a semiconductor laser.

12. An optical communication arrangement as in claim 1 wherein the arrangement comprises an optical receiver including a photosensitive optical device, the dual-in-line package further including a bypass capacitor inserted across a pair of power supply leads, and the metallic cover plate connecting to an electrical ground plane formed on the bottom support plate.

13. An optical receiver as defined in claim 12 wherein the photosensitive optical device comprises a PIN photodiode.

14. An optical receiver as defined in claim 13 wherein the PIN photodiode comprises a silicon photodiode.

15. An optical receiver as defined in claim 13 wherein the PIN photodiode comprises an InGaAs photodiode.

16. An optical receiver as defined in claim 12 wherein the photosensitive optical device comprises an avalanche photodiode.

* * * * *